June 28, 1932.  G. C. WALBERG  1,865,066
FISHING REEL
Filed Dec. 4, 1930  2 Sheets-Sheet 1
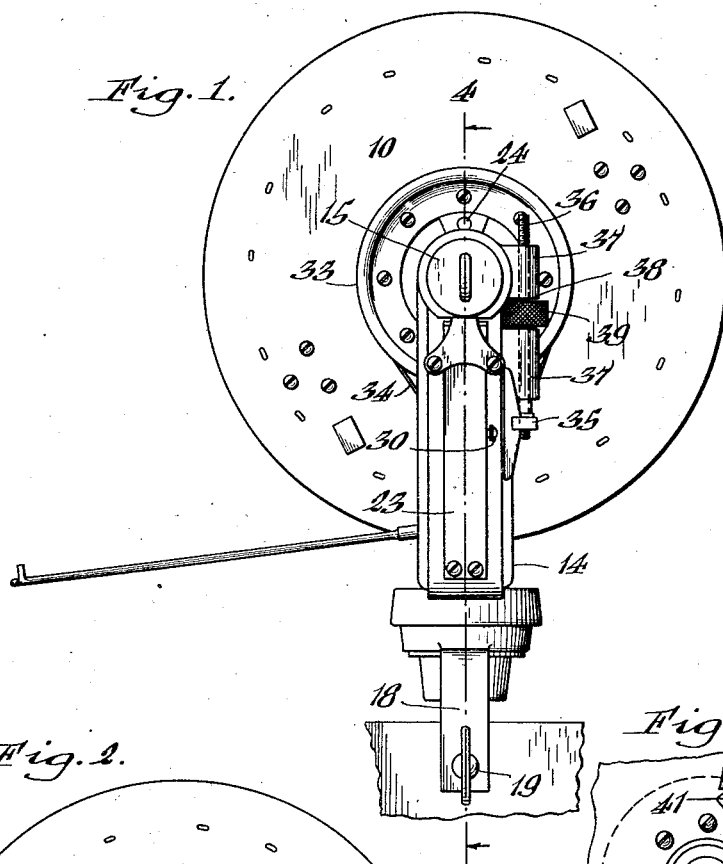
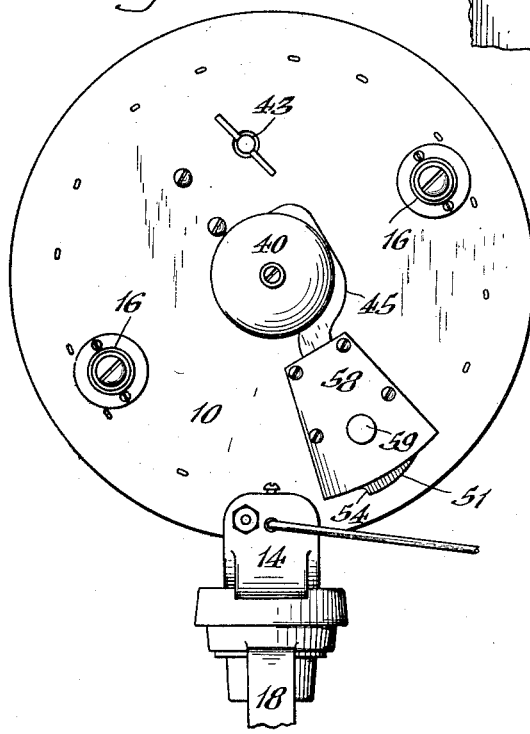
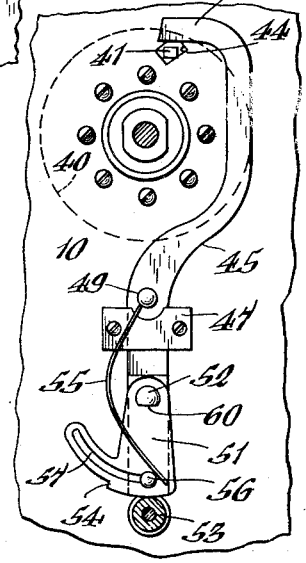
Inventor,
Gerrit C. Walberg,
by Walter P. Geyer
Attorney.

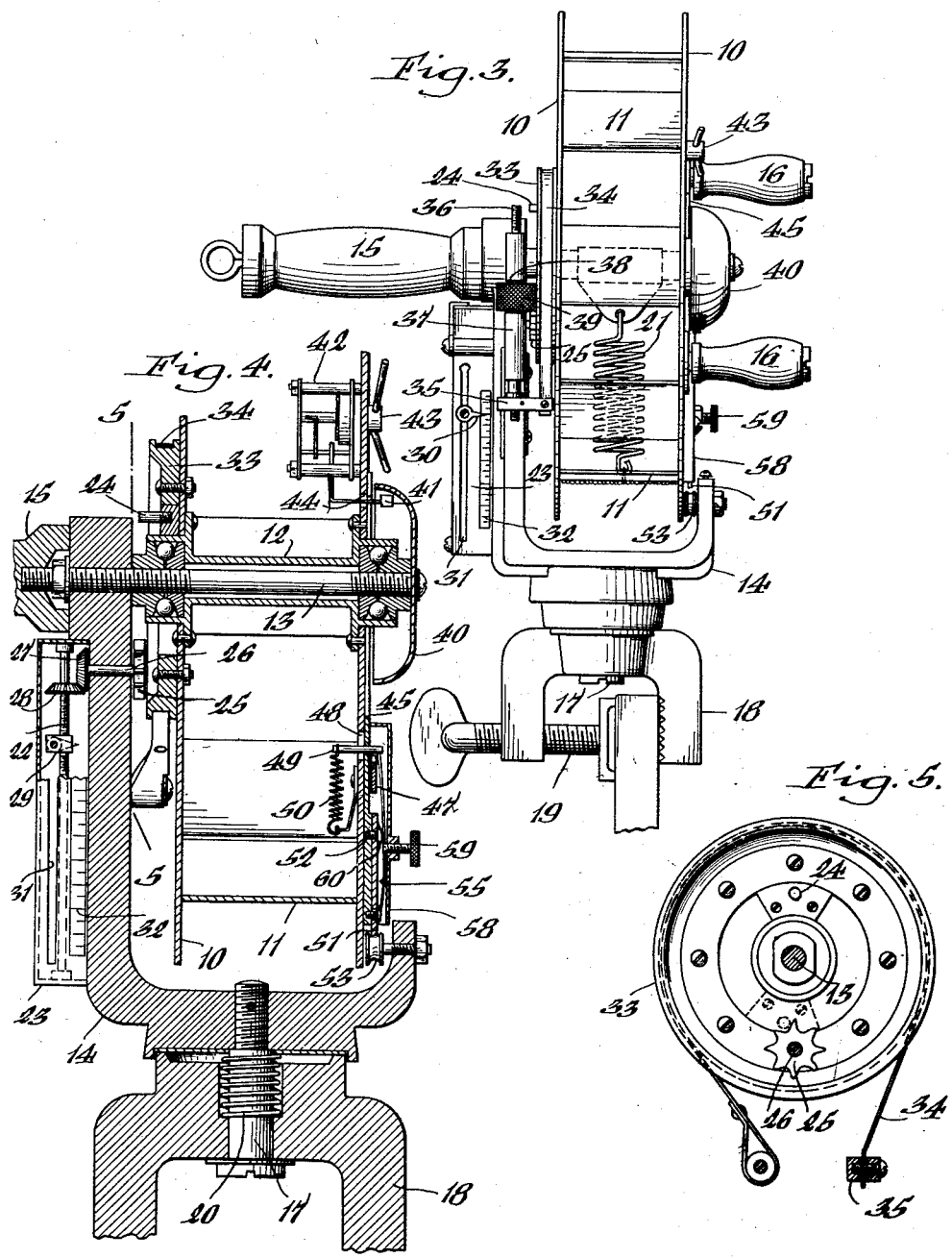

Patented June 28, 1932

1,865,066

UNITED STATES PATENT OFFICE

GERRIT C. WALBERG, OF BUFFALO, NEW YORK

FISHING REEL

Application filed December 4, 1930. Serial No. 499,941.

This invention relates to improvements in fishing reels.

It has for one its objects to provide a simple and practical device of this character having means for indicating the number of feet of fish line played out from the reel.

Another object of the invention is the provision of a readily controlled brake mechanism for regulating the turning of the reel.

A further object is to provide the reel with a simple and compact audible alarm mechanism for indicating when a strike or catch has been made.

Other features of the invention reside in the construction and arrangement of parts hereafter described and particularly pointed out in the appended claims.

In the accompanying drawings:—

Figure 1 is a side elevation of a fishing reel embodying my invention. Figure 2 is a side elevation thereof taken from the opposite side of the reel. Figure 3 is an end view of the same. Figure 4 is an enlarged fragmentary transverse section taken on line 4—4, Figure 1. Figure 5 is a cross section taken on line 5—5, Figure 4. Figure 6 is a face view of the audible signal mechanism with the cover plate and bell-cap removed.

Similar characters of reference indicate corresponding parts throughout the several views.

In its preferred construction, my improved fishing reel consists of a spool-like member composed of circular side plates 10, 10 held in spaced relation by an annular row of webs 11 about which the fish-line is wound. At its center the reel is provided with a hub 12 which is revolvably mounted on a spindle 13 projecting horizontally from a support consisting of a substantially L-shaped bracket 14 which terminates at its upper end in axial alinement with the spindle in a handle 15. Handles 16 are also applied to the reel on that side thereof opposite to the handle 15 for rotating the same. It is desirable that the reel be free to oscillate about an axis at right angles to the spindle 13, and for this purpose the lower horizontal arm of the bracket 14 is mounted to swivel about the axis of an upright spindle-bolt 17 rising from a yoke 18 adapted to be secured to the boat or other object by a clamping-bolt 19. In order to restrain, to some degree, the free turning of the reel-bracket about the yoke, a coil spring 20 is applied to the spindle bolt 17 between the opposing faces of the bracket and the yoke, as seen in Figure 4, the spring creating sufficient friction between the parts to yieldingly resist their relative movement.

The fish-line is, by preference, attached to a spring 21 radiating from and secured at its inner end to the reel-hub, so that if the line is completely unwound for any reason, as when a strike is made, the shock incident thereto will be absorbed by the spring and prevent breakage of the affected parts.

For the purpose of indicating to the user the number of feet of line which have been played off the reel, I employ a depth gauge which is preferably constructed as follows:

The operative parts of this depth gauge are mounted on the upright arm of the bracket 14 and the same consists of a revolving screw 22 supported at its upper and lower ends in a housing 23 secured to the outer side of said bracket-arm and driven from the revolving motion of the reel in an intermittent fashion. To this end a trip pin 24 is provided which projects from the adjoining side of the reel into the path of a toothed wheel 25 fixed to a horizontal shaft 26 journaled in the upright bracket-arm and having a bevel gear 27 at its outer end meshing with a similar gear 28 fixed to the upper end of the screw 22. Applied to the latter is a nut 29 carrying a pointer or indicator 30 which is free to travel vertically on the screw as the reel is turned in one direction or the other. The indicator travels in an upright slot 31 formed in the housing 23 and traverses a scale 32 divided to provide graduations indicating feet or like unit of measure. By this construction, it will be seen that as the reel is turned in a direction to let out the fish-line, the trip pin 24 will intermittently turn the toothed wheel 25 and thence the screw 22 to shift the nut 29 in a direction to indicate the number of feet of line which has been played out, thereby enabling the fisherman to accurately let out as much line as the fishing conditions will permit.

For the purpose of regulating the speed of turning of the reel when playing out the fish-line, I preferably employ an adjustable brake consisting of a drum 33 applied to that side plate of the reel adjoining the upright arm of the bracket 14 and a brake band 34 partially encircling the drum and fixed at one end to said bracket-arm and joined at its other end to an arm 35 applied to the lower end of an adjusting screw 36 guided in extensions 37 projecting from the upper end of the bracket-arm and horizontally spaced to provide a recess 38 between them. Applied to this adjusting screw which is disposed substantially tangentially of the drum, and held against endwise movement thereon in the recess 38 is a knurled nut 39 which when turned in one direction or the other raises or lowers the adjusting screw to correspondingly loosen or tighten the brake band relative to the brake drum, thereby enabling the user to readily adjust the brake to suit conditions.

An audible alarm is associated with the reel to indicate when a strike or catch has been made or when for any other reason the reel has been caused to unwind. While this alarm may be of any appropriate construction, it preferably consists of a bell 40 having an automatically operated vibrating mechanism for actuating the hammer 41, such mechanism, as shown in Figure 4, consisting of a spring motor 42 of ordinary construction which, when the hammer is released, causes an automatic ringing of the bell. As seen in Figure 4, the spring motor is applied to one of the side plates 10 of the reel and the same has a suitable handle 43 for tightening its spring when run down. The bell-body may be conveniently mounted on the outer face plate of the reel about its hub and the hammer 41 projects through an opening 44 in such plate where it is disposed to strike the bell body. In order to control the alarm device in conjunction with the turning of the reel in a direction to play out the fish-line, I preferably employ a releasable control element or shiftable keeper bar 45 which is applied to the outer face of the front reel plate and terminates at its upper end in a hook-like extension 46 which normally engages the hammer shank and prevents the bell from ringing. This keeper bar may be radially disposed as shown in Figures 2 and 6 and is guided for radial movement in a suitable guide plate 47. Projecting from this keeper bar through a radial slot 48 in the respective reel plate 10 is a pin 49 and connected to this pin is a spring 50 which normally urges the keeper bar outwardly or in a direction to prevent vibration of the bell hammer. The means for automatically releasing the keeper bar from the hammer to permit the ringing of the bell preferably consists of a trip lever 51 fulcrumed at 52 to the outer end of the keeper bar 45 and adapted to engage, at each revolution of the reel, a roller 53 or like tappet element applied to the bracket 14, so that for each unwinding revolution of the reel the trip lever will encounter the roller and cause the keeper bar to be shifted inwardly or in the direction to momentarily release the bell hammer and ring the bell. The moment the trip lever passes the roller the spring 50 returns the keeper bar to its normal engaged or latched position with the bell hammer.

The trip lever 51 is so constructed and arranged that, when the reel is turned in a direction to wind up the fish-line, it will not permit the release of the keeper bar 45 to ring the bell. To this end, the contacting outer edge of the trip lever is provided with a substantially radial stop shoulder 54 which abuts against the roller and causes the trip lever to be merely rocked idly about its pivot without affecting the keeper bar. A spring 55 connected to the trip lever serves to normally maintain it in the position shown in Figure 6, and as such lever travels in a clockwise direction past the roller 53 it is swung rearwardly, thereby temporarily tensioning the spring which acts to return the trip lever to its normal position as the same travels past and is released from the contact with said roller. A stop pin 56 applied to the keeper bar 45 and engaging an arcuate slot 57 in the trip lever is provided for permitting the free idle swinging movement of the trip lever as the reel is turned in a direction to wind up the fish-line and to prevent swinging of the trip lever when the reel is turned in the opposite direction to unwind the fish-line. The lower portion of the keeper bar and associated parts may be covered by a suitable plate 58, it being understood however, as shown in Figure 2, that the free outer edge of the trip lever projects beyond the cover plate where it is free to encounter the roller 53. Should it be desired to dispense with the alarm device, this may be readily effected by the provision of a stop screw 59 carried by the cover plate and adapted to engage a shoulder or projection 60 projecting from the lower end of the keeper bar. In Figure 6 this shoulder is shown as formed on the head of the pivot 52 of the trip lever 51. By this arrangement, when it is desired to dispense with the alarm, the keeper bar 45 is shifted inwardly and the stop screw 59 is turned down to bring it in contact with the stop shoulder 60.

I claim as my invention:—

1. A fishing reel, comprising a revolving member for the fish-line, an alarm device applied to said member, a releasable control element for said device normally arranged to render it inoperative, and trip means for releasing said element to render the alarm device operative when the revolving member is turned in a direction to play out the line.

2. A fishing reel, comprising a support, a revolving member for the fish-line mounted on said support, an alarm device applied to said member, a releasable control element for said device normally arranged to render it inoperative, a tappet applied to said support, and a trip on said releasable element arranged to be tripped by said tappet at each revolution of said revolving member to shift said element to its released position to render the alarm operative.

3. A fishing reel, comprising a support, a revolving member for the fish-line mounted on said support, an alarm device applied to said member, a radially-shiftable bar applied to the revolvable member and normally arranged to render the alarm inoperative, a tappet applied to said support, and a trip lever fulcrumed on said bar for engagement with said tappet to shift the bar to a position to render the alarm operative when the revolving member is turned in a direction to unwind the fish-line, said trip lever being free to idly swing about its pivot when said member is turned in the opposite direction without affecting the shiftable bar.

GERRIT C. WALBERG.